3,137,687
WATER-INSOLUBLE DISAZO DYESTUFFS
Hans Spoerri, Muenchenstein, and Hans W. Liechti, Oberwil, Basel-Land, Switzerland, assignors to Ciba Limited, Basel, Switzerland, a company of Switzerland
No Drawing. Filed Oct. 17, 1961, Ser. No. 145,769
Claims priority, application Switzerland Oct. 25, 1960
6 Claims. (Cl. 260—160)

This invention provides new disazo-dyestuffs which are free from sulfonic acid and sulfonic acid amide groups and correspond to the formula (1) 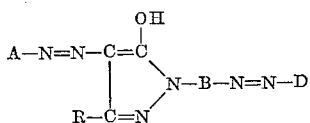

in which A and B are benzene radicals, D is the residue of a coupling component of the benzene series, and R represents a substituent.

The invention also provides a process for the manufacture of the above dyestuffs, wherein a diazotized aminoazo-dyestuff which is free from sulfonic acid and sulfonic acid amide groups and corresponds to the formula (2) 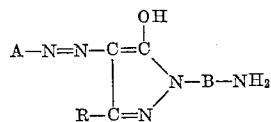

in which A, B and R have the meanings given above, is coupled with a hydroxy-benzene which is free from sulfonic acid and sulfonic acid amide groups.

The aminoazo-dyestuffs of Formula 2 may be obtained by coupling a diazotized aminobenzene with a 1-aminophenyl-, 1-nitrophenyl- or 1-acylaminophenyl-pyrazolone-5, and, when necessary, reducing the nitro group or splitting off of the acyl group. The benzene residue of the aminobenzene used as diazo-component may be substituted, advantageously by nonionisable substituents, for example, alkyl groups, especially by methyl or ethyl groups, or substituted alkyl groups, for example trifluoromethyl groups, or acyl groups, for example, acetyl groups, or alkoxy groups, for example, methoxy ethoxy or cyanethoxy groups, or halogen atoms such as chlorine or bromine atoms, or functionally converted carboxylic acid groups such as carboxyalkyl groups, especially carboxymethoxy groups, or carboxylic acid amide groups, or cyano, thiocyano or nitro groups, or acylamino groups or alkyl sulfone groups, for example, methyl sulfone groups.

Especially interesting are diazo-components that contain an electro-negative substituent in ortho-position to the amino group, especially a halogen atom or a nitro, cyano, or carboxylic acid ester group, for example, a carbalkoxy group.

As examples of the diazo-components, there may be mentioned the following:

1-amino-2- or -4-methylbenzene,
1-amino-2- -4-chlorobenzene,
1-amnio-2- or -4-bromobenzene,
1-amino-2- or -4-cyanobenzene,
1-amino-2- or -4-methylsulfonyl-benzene,
1-aminobenzene-2- or -4-carboxylic acid methyl ester,
1-aminobenzene-2-carboxylic acid hydroxyethyl ester,
1-amino-2-methoxybenzene,
1-aminobenzene-2-carboxylic acid methoxyethyl ester,
1-amino-2-nitrobenzene,
1-amino-2:4- or 2:5-dichlorobenzene,
1-amino-2-chloro-4-methylbenzene or
1-amino-2-cyano-4-chlorobenzene.

There are advantageously used as aminophenyl-pyrazolones, 1-amino-3-alkyl-(especially methyl)-pyrazolones. They advantageously contain the amino group in the 3'- or 4'-position. The diazotization of the aminoazo-dyestuff may be carried out by a method in itself known, for example, by means of hydrochloric acid and sodium nitrite. The diazo-monazo-dyestuffs so obtained are coupled in alkaline medium, for example, a medium rendered alkaline with an alkali metal carbonate, with the end components, if desired, in the presence of an agent capable of accelerating the coupling process, such as pyridine or picoline.

As end components there may be mentioned, for example hydroxybenzenes that couple in para-position to the hydroxyl group, and especially phenol, but also substituted phenols, especially those containing a halogen atom or a lower alkyl or alkoxy group, in which the para-position is preferably unsubstituted. As examples there may be mentioned 1-hydroxy-2- or -3-methylbenzene, 1-hydroxy-2-chlorobenzene 1-hydroxy-2- or -3-methoxybenzene 1-hydroxy-2- or -3-ethoxybenzene or 1-hydroxy-2:5- or 3:5-dimethylbenzene.

The new disazo-dyestuffs, especially after a suitable pasting treatment, which may be coupled with a reprecipitation, for example, from sulfuric acid, are very suitable for dyeing or printing hydrophobic fibrous materials, for example, of cellulose esters or ethers, of polyamides or polyurethanes, of polyvinyl chloride and especially of polyesters, for example, polyethylene tetraphthalates. They produce pure, strong yellow dyeings possessing especially good properties of fastness to light and sublimation by the usual dyeing processes, for example, from dye baths which contain a dispersion of the dyestuff and, if necessary, a dispersing agent, at a temperature near 100° C., if desired, with the addition of a swelling agent, such as ortho-hydroxy-diphenyl, or at a temperature above 100° C. under superatmospheric pressure.

A particular advantage of the dyestuffs of the invention is that, notwithstanding the enolic hydroxyl group, they can be used for dyeing from alkaline baths. This renders them especially suitable for dyeing by the so-called "Thermo-fixation Process," in which the fabric to be dyed is impregnated, preferably at a temperature not exceeding 60° C., with an aqueous dispersion of the dyestuff, which advantageously contains 1 to 50% of urea and a thickening agent, especially sodium alginate, and the material is then squeezed in the usual manner. The squeezing is preferably carried out in such a manner that the impregnated material retains 50 to 100% of its initial weight of the dye liquor.

The fixation of the dyestuff is carried out by heating the impregnated material at a temperature above 100° C., for example, within the range of 180 to 210° C., and, if desired, the impregnated material may be dried, for example, in a current of warm air, before the heat treatment.

The aforesaid thermo-fixation process is especially suitable for dyeing mixed fabrics of polyester fibres and cellulose fibres, especially cotton. In this case the padding liquor contains, in addition to a dyestuff of the invention, a dyestuff suitable for dyeing cotton, for example, a vat dyestuff or especially a so-called reactive dyestuff, that is to say, a dyestuff that is fixed on the cellulose fibres with the formation of a chemical bond, such a dyestuff being, for example, one containing a chlorotriazine or chlorodiazine radical. In the latter case it is of advantage to add an acid-binding agent, for example, an alkali metal carbonate, alkali-metal phosphate, alkali metal borate, alkali metal perborate or a mixture of two or more of these agents to the padding solution. When the vat dyestuffs are used, the heat treatment of the padded fabric is followed by a treatment with an aqueous alkaline solution of one of the reducing agents customarily used in vat dyeing processes.

The following examples illustrate the invention, the parts and percentages being by weight:

Example 1

13.8 parts of 1-amino-2-nitrobenzene are diazotized in the usual manner and then coupled with 18.9 parts of 1-(4'-aminophenyl)-3-methyl-pyrazolone-5 in a medium rendered alkaline with sodium carbonate. The amino-monoazo-dyestuff so obtained is isolated, diazotized, and then mixed at 5 to 10° C. with a solution of 9.4 parts of hydroxybenzene in 100 parts of water, 10 parts of a solution of sodium hydroxide of 30% strength and 20 parts of sodium carbonate. Coupling to give the disazo-dyestuff takes place immediately. The latter is filtered off, washed with water until the washings have a neutral reaction, and then dried.

The new water-insoluble dyestuff of the formula

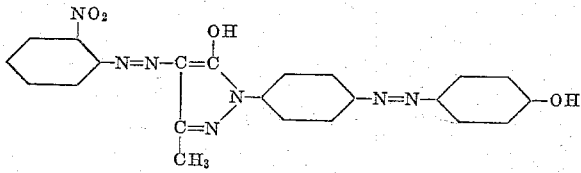

is a yellow powder which, in fine dispersion, dyes polyamide fibres yellow tints of excellent fastness to light. The new dyestuff is especially suitable for dyeing polyester fibres, not only from acetic acid dye baths, but also from alkaline high temperature dye baths to yield reddish yellow tints of good fastness to light and very good fastness to sublimation.

By using 1-(3'-aminophenyl)-3-methyl-5-pyrazolone as middle component, instead of 1-(4'-aminophenyl)-3-methyl-5-pyrazolone a dyestuff is obtained that has the same excellent properties.

Example 2

12.75 parts of 1-amino-2-chlorobenzene are diazotized and then coupled with 18.9 parts of 1-(4'-aminophenyl)-3-methyl-5-pyrazolone in a medium rendered alkaline with sodium acetate. The amino-monoazo-dyestuff so obtained is isolated, diazotized and then coupled at 5–10° C. in a solution of 10.8 parts of 2-hydroxytoluene rendered alkaline with sodium carbonate. Coupling to form the disazo-dyestuff takes place immediately. The latter is isolated, washed with water until the washings are neutral, and then dried.

The new water-insoluble dyestuff has the formula

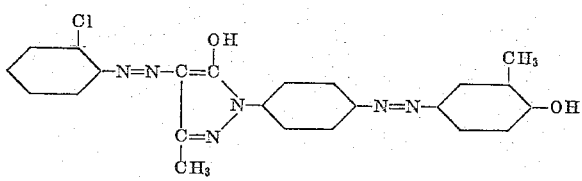

and is a yellow powder which, in fine dispersion dyes polyamide fibres yellow tints that are fast to light. However, the new dyestuff can also be used for dyeing polyester fibres from an acetic acid dye bath (see Example 4) or from an alkaline high temperature dye bath (see Example 5), to yield reddish yellow tints of good fastness to light and very good fastness to sublimation.

Dyestuffs having the same excellent properties are obtained by using hydroxybenzene, 3- or 4-hydroxytoluene, 2- or 3-methoxy-1-hydroxybenzene as end component, instead of 2-hydroxytoluene.

By using 1-amino-2:4-dichlorobenzene, 1-amino-2:5-dichlorobenzene or 1-amino-2-chloro-4-nitrobenzene as initial component, instead of 1-amino-2-chlorobenzene, dyestuffs having the same excellent properties are obtained.

Example 3

15.1 parts of 2-amino-benzoic acid methyl ester are diazotized in the usual manner, and then coupled at 5–10° C. with 18.9 parts of 1-(4'-amino-phenyl)-3-methyl-pyrazolone-(5) in a medium rendered alkaline with sodium carbonate. The amino-monoazo dyestuff so obtained is isolated, diazotized, and then coupled at 5 to 10° C. in a solution of 9.4 parts of hydroxybenzene rendered alkaline with sodium carbonate. Coupling to form the disazo-dyestuff takes place immediately. The latter is filtered off washed with water until the washings give a neutral reaction, and then dried.

The new water-insoluble dyestuff has the formula

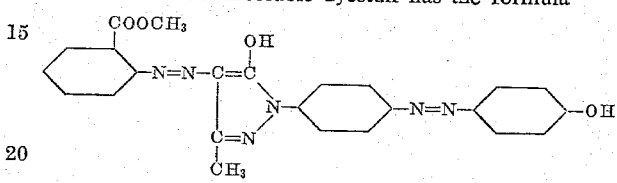

and is a yellow powder which, in fine dispersion, dyes polyamide fibres with yellow tints that are fast to light. However, the new dyestuff can also be used for dyeing polyester fibres from an acetic acid dye bath, or from an alkaline high temperature dye bath, to yield yellow tints of good fastness to light and very good fastness to sublimation.

By using 2-amino-benzoic acid-β-hydroxyethyl ester or 2-amino-benzoic acid-β-methoxyethyl ester as initial component, instead of 2-amino-benzoic acid methyl ester, dyestuffs having the same excellent properties are obtained.

Example 4

1 part of the dyestuff obtained as described in Example 2 is ground wet with 2 parts of an aqueous solution of 50% strength of sulfite-cellulose waste liquor, and is then dried.

This dyestuff product is stirred with 40 parts of an aqueous solution of 10% strength of a condensation product of octadecyl alcohol with 20 molecular proportions of ethylene oxide, and then added to 4 parts of a solution of acetic acid of 40% strength. By diluting with water 4000 parts of dye bath prepared.

100 parts of a cleaned fibrous material of a polyester are entered into the dye bath at 50° C., the temperature is raised in the course of ½ hour to 120 to 130° C., and the material is dyed at that temperature for one hour in a closed vessel. The material is then thoroughly rinsed. A strong bright yellow dyeing is obtained, that has a good fastness to light and a very good fastness to sublimation.

Example 5

1 part of the dyestuff obtained as described in Example 2 is ground wet with 2 parts of an aqueous solution of 50% strength of sulfite-cellulose waste liquor, and is then dried.

This dyestuff product is stirred with 40 parts of an aqueous solution of 10% strength of a condensation product of octadecyl alcohol with 20 molecular proportions of ethylene oxide, and 4 parts of trisodium phosphate are added. By diluting with water 4000 parts of dye bath are prepared.

100 parts of a cleaned fibrous material of a polyester are entered into the dye bath at 50° C., the material is dyed in a closed vessel, the temperature being raised in the course of ½ hour to 120 to 130° C. and the dyeing being continued at that temperature for one hour. The material is then thoroughly rinsed. A strong bright yellow dyeing is obtained, which has the same strength, tint and fastness properties as the dyeing produced by Example 4.

A similar dyeing is obtained by padding or printing a polyester fabric with a concentrated dispersion of the dyestuff in the presence of a thickening agent such, for example, as an alginate, and, if desired, after drying the fabric fixing the dyestuff on the fibre by heating it for a short time at about 220° C. (Thermosol Process).

*Example 6*

200 parts of urea and 20 parts of the dyestuff of the formula

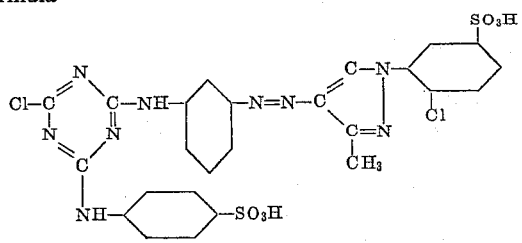

are dissolved in 400 parts of water by boiling. To the solution are added 100 parts of an aqueous dispersion containing 30 parts of the dyestuff obtained as described in Example 2 and 2 parts of the sodium salt of diisobutyl naphthalene sulfonic acid, the whole is then thoroughly mixed by means of a high speed stirrer for a few minutes, during which 100 parts of a solution of 20% strength of sodium carbonate and 400 parts of a solution of 50% strength of sodium alginate are added simultaneously.

The resulting padding solution is used to pad a mixed fabric of 35 parts of cotton and 65 parts of polyethylene terephthalate fibres at 50 to 60° C. in such a manner that the impregnated material retains 65 to 70% of its initial weight of the dyestuff solution. The material is dried, and then subjected to a heat treatment for one minute at 200 to 210° C.

The material is washed for 20 minutes in a boiling solution of 2 grams of an ion-free detergent and 2 grams of calcined sodium carbonate, per litre, then rinsed and finally dried. A purse yellow dyeing having very good properties of fastness is obtained.

What is claimed is:

1. A disazo dyestuff of the formula

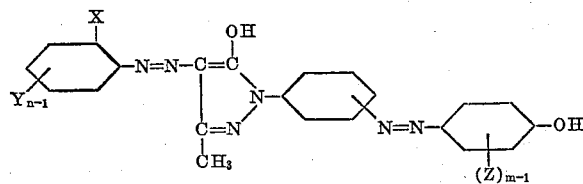

in which X is a member selected from the group consisting of chlorine, bromine, nitro, cyano, carbo-lower alkoxy and carbo-lower alkoxyalkoxy, Y a member selected from the group consisting of chlorine, bromine lower alkyl and alkoxy, $n$ is a whole number from 1 to 3 and in which formula the second azo group is separated from the N- atom of the pyrazolone radical by 3 to 4 carbon atoms; Z represents a member selected from the group consisting of chlorine, bromine, lower alkyl and lower alkoxy and $m$ a member from 1 to 3.

2. The dyestuff of the formula

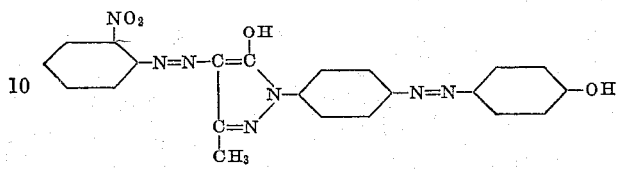

3. The dyestuff of the formula

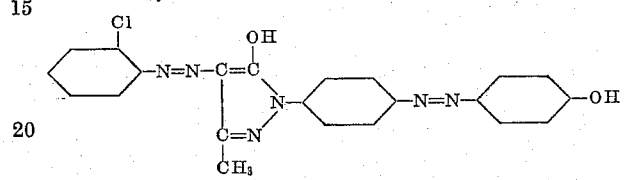

4. The dyestuff of the formula

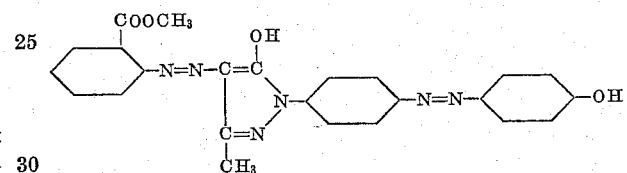

5. The dyestuff of the formula

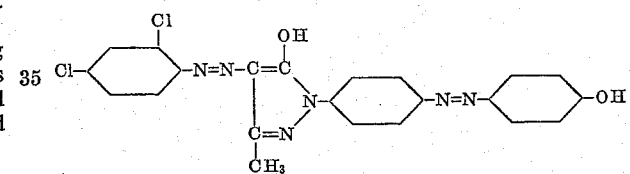

6. The dyestuff of the formula

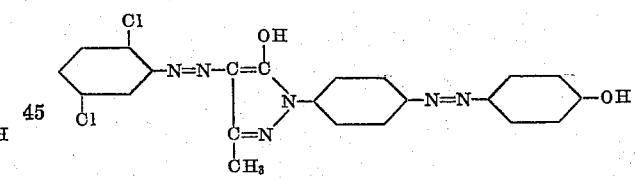

References Cited in the file of this patent

UNITED STATES PATENTS

| | | |
|---|---|---|
| 2,317,387 | Kvalnes et al. | Apr. 27, 1943 |
| 2,342,451 | Carson | Feb. 22, 1944 |
| 3,066,134 | Gangneux | Nov. 27, 1962 |